Patented Nov. 13, 1928.

1,691,273

UNITED STATES PATENT OFFICE.

HENNING GUSTAV FLODIN, OF ROSLAGS-NASBY, AND EMIL GUSTAF TORVALD GUSTAFSSON, OF STOCKHOLM, SWEDEN, ASSIGNORS TO HAMPUS GUSTAF EMRIK CORNELIUS, OF STOCKHOLM, SWEDEN.

METHOD OF PRODUCING IRON AND ALLOYS OF IRON HAVING A VERY LOW PERCENTAGE OF CARBON.

No Drawing. Application filed June 22, 1925, Serial No. 38,940, and in Sweden May 11, 1925.

In the methods heretofore used for producing iron and other carbon-binding metals and alloys thereof it has been found very difficult to produce continuously such metals in a molten state with a very low percentage of carbon, for instance not exceeding 0.05%. According to various methods, single charges have attained such a low percentage of carbon, it is true, but with such an uncertainty that production according to these methods on a larger scale has not been possible. As far as we are aware, percentages of carbon of 0.03 and less have been attained in commercial operation only in very rarely occurring exceptional cases. Therefore, iron and other carbon-binding metals with such a low percentage of carbon have commanded excessive prices as compared with metals holding, for instance, 0.10% of carbon.

According to the method worked out by us for producing carbon-binding metals and alloys thereof, which are low in carbon, directly out of oxide ores, for example, in conformity to our patent application Serial No. 756,557, the ore is finely crushed and intimately mixed with finely divided carbon or carbonaceous material and, in some cases with some other reducing agent, the mixture being then, if desired with the use of a suitable binding agent and in connection with a drying process transformed into briquettes or pieces with the particles of the reducing agent and the grains of ore fixed as regards their mutual positions, and the briquettes or pieces being fed into an electric furnace preferably continuously or practically continuously and reduced and melted in said furnace in a non-oxidizing atmosphere at the surface of a slag bath formed during reduction or especially prepared before the feeding in of the charge, i. e. the briquettes are reduced and melted whilst lying or floating on top of the slag bath. By this method we have been successful in producing continuously, on a commercial scale, ingot metal both in the form of iron and as alloyed iron with percentages of carbon varying between 0.05 and 0.10%. At the same time, the percentage of metal oxides in the slag formed has been kept within very low or reasonable limits, so that the loss of metal in the slag has been very small or immaterial. The amount of reducing agent added in the form of carbon or carbonaceous material, if desired, together with other reducing agents, such as ferro-silicon, ferro-manganese, ferro-silicon, aluminium, ferro aluminium silicon or the like, has been so adapted that the quantity of active reducing agent in the briquettes or the pieces corresponds to the quantity required for the amount of ore involved and for the carbonization of the metal formed.

We have found, however, that by proportioning the quantity of the reducing agent added, the main portion of which is always constituted by carbon or carbonaceous material i. e. the process is always endothermic, so that there is a shortness of active reducing agent in the briquettes or pieces with respect to the quantity required for the amount of ore involved, still lower percentages of carbon will be attained in the metal formed. The use of this shortness of reducing agent forms the characteristic features of the present invention. When carbon only is used as a reducing agent, we have found, for instance, with a shortness in the briquettes or pieces of at least 5% of active carbon, the operation in the electric furnace being otherwise suitably adapted, that a metal will be obtained having a percentage of carbon not exceeding 0.03%, which result is attained in continuous operation, i. e. one charge after another. Obviously, the loss of metal in the flag will be greater when using such a shortness of reducing agent, but this loss is perfectly compensated by the greater value of the metal obtained owing to its low percentage in carbon.

In this connection, the expression active reducing agent, that is to say, carbon alone or admixed with some other reducing agent, means the reducing agent that is available for the reduction of the metal oxides in the briquettes or pieces, after the quantities required for other purposes have been deducted. Thus, if the briquettes or pieces contain, for example, carbonic acid or water, which, when feeding is effected into the furnace, are permitted to react with the reducing agent involved, a quantity of the reducing agent equivalent to the carbonic acid and the water will be consumed, and cannot be regarded as active for the reduction of the metal oxides. Any sulphurous acid and sulphuric anhydride involved may in the same manner consume some of the reducing agent during the reduction in the furnace. Other substances, such as chemically combined oxygen contained in the carbonaceous material, may in the same way entail a non-desirable but unavoidable consumption of carbon.

By reason of a shortness of carbon being present in the briquettes or pieces, i. e. the quantity of active carbon not coming up to the quantity required for the reduction of the metal oxide, which shortness is evenly distributed in the same, the metal drops formed during the reduction in the slag bath have no occasion appreciably to combine with carbon. A metal which is very poor in carbon will thus accumulate at the bottom of the furnace below the slag which is rich in metal oxides, such slag may have, in turn, to a certain degree a refining action on the metal, which action is the more powerful the higher the percentage is of metal oxides, for instance, of ferrous oxide, in the slag. Irrespective of this refining action of the slag the result is that a metal very low in carbon is obtained on tapping, provided the operation of the furnace is otherwise properly conducted.

When reducing and melting briquettes short of active reducing agent, in the electric furnace, the slag will, as already set forth, contain a rather considerable quantity of metal oxides, and will then, as a rule, be more quick-flowing than a slag containing less metal oxides, the composition otherwise remaining the same. When operating with carbon electrodes in the furnace, which method appears to be the most common, this circumstance is of a decided disadvantage for the reducing process proper, when carrying out the process in an electric furnace having one or more downwardly extending electrodes that can be raised and lowered. Among other things, the slag will be more conductive than before, whereby the resistance of the slag and thus the development of heat in the slag bath proper will be less when the furnace is run with the electrodes close to or sunk into the slag. The length of the electric arcs will also be greater, and, consequently, the temperature in the upper portion of the furnace will rise, whereas by the reduced temperature of the slag the metal formed at the bottom of the furnace will be relatively cold. By the quick-flowing properties of the slag, the latter is apt to splash up onto the electrodes when the charge is fed into the furnace, and metal rather rich in carbon will thus be reduced out of the slag by the electrode carbon thereby increasing the percentage of carbon of the metal produced. By reason of the high percentage of metal oxides in the slag the furnace should be run with the electrodes as far as possible out of contact with the slag bath in the electric furnace when a charge is used which is low in carbon.

In order to obviate this drawback, the slag is made viscous preferably by adding into the furnace substances having the property of rendering the slag viscous, such substances being, for instance, lime, dolomite, quartz, sand or the like, such addition being effected in admixture with the charge or direct into the furnace or in both these manners. The kind of substance selected and the quantity thereof used must evidently be adapted to the substances contained in the gangue and in any of the binding agents and admixtures. For example, if a basic slag is formed in melting the charge, lime or dolomite should be added. If, on the other hand, an acid slag is formed, quartz or sand is preferably added.

By the addition of such substances, for instance, to the slag in the furnace, the conductivity of the slag will also be reduced. It will then be possible, prior to tapping, to increase the temperature of the metal reduced by operating the furnace with the electrodes sunk into the slag for a suitable time.

In producing alloys, for instance, iron containing chromium, very low in carbon, as rustless iron and steel, the ores may be mixed and formed into briquettes in the requisite proportions for the desired composition of the alloy, direct with a shortness of active carbon and, if desired, some other reducing agent, or, special briquettes or pieces may be prepared out of each ore per se, which briquettes are reduced and melted in the electric furnace, either mixed together or in any sequence after each other. If different kinds of charges are used for the various ores, the percentages of active reducing agent in the various charges are proportioned so that there will be a shortness of reducing agent in the total quantity of the charges. The amount of reducing agent in the different charges may then, preferably, be so proportioned that there is a shortness in the charge of the more readily reduced metal, whereas in the charge of metal which is more difficult to reduce, the quantity of active reducing agent corresponds to the amount which is theoretically required. In some cases it may be more suitable to have a shortness of reducing agent in the metal which is more difficult to reduce. The invention does not, however, depend on which kind or kinds of charges are short of reducing agent, only that a shortness of said nature exists in the total amount of charge.

For utilizing any metals contained in the slag in the form of metal oxides, it is preferable, prior to tapping, to add a thermic reducing agent, for instance ferro-silicon, ferro-aluminium, silicon, aluminium or the like, to the slag in the furnace. For this purpose ferro-silicon will be found particularly suitable by reason of its cheapness. Obviously, the reducing agent added to the slag should be as free from carbon as possible, and when added it is preferably distributed over as large a portion of the slag bath as possible. The metal or alloy added, having a great affinity for oxygen, will then reduce out of the slag quantities of iron, chromium or other metal contained in the slag, equivalent to its oxygen-absorbing capacity. The metals thus reduced sink down through the slag into the metal already reduced. At the same time the smaller percentage of metal oxides decreases the electrical conductivity of the slag, so that prior to tapping the furnace may be operated with the electrodes immersed into the slag and run with resistance, thereby increasing the temperature of the molten metal. If a suitable quantity of lime, dolomite, or the like for binding the silicic acid, alumina etc. formed is added simultaneously with or immediately after the ferro-silicon, the electrical resistance of the slag will be further increased, besides which a slag will be obtained which is more suited to the lining of the furnace.

It will be advantageous to charge with briquettes composed of an intimate mixture of the thermic reducing agent and the substance added for binding the by-products formed in the reaction of the thermic reducing agent with the metal oxides in the slag. The lime, dolomite or the like will then more readily act on the silicic acid formed.

The molten metal obtained may be deoxidized during or after the tapping, in known manner by the addition of ferro-manganese and, if desired, of ferro-silicon to increase the density of the metal, but in this case admixtures should be used which are low in carbon, in order that an increase of the percentage of carbon of the metal shall not take place.

As illustrative examples of the process according to the invention the following may be used.

For the production of iron having a carbon content not exceeding .05% according to the present invention we may proceed as follows:

Finely divided iron oxide ore and finely divided carbon in the form of, for instance, charcoal, coke or anthracite as well as a suitable binding agent are thoroughly mixed in such a proportion that the quantity of active carbon in the mixture amounts to 90 to 95% of the quantity theoretically required for the complete reduction of the ore. If carbonaceous binding agent is used, the percentage of active carbon in said agent must also be paid regard to in calculating the quantity of reducing agent. However, the binding agent should preferably consist of lime water prepared by slaking burnt lime, as lime must always be used in the process in order to obtain a suitable slag having a sufficient high resistance to give the underlying metal the necessary high temperature. However, to the mixture only such quantity of lime water is supplied as is required to bind the grains of the ore and the carbon particles to each other, whereas the remaining quantity of the lime necessary for a good working is preferably added directly to the furnace during the course of the smelting. Then the mixture thus obtained is transformed into briquettes which are then dried, until the water is removed and the grains of the ore and the carbon particles are fixed in their mutual positions by the binding agent which is transformed into solid state.

The briquettes are then fed into the electric furnace, preferably continuously or in small portions at intervals adapted to a regular course of the reduction. The briquettes are reduced and melted lying in a thin layer at the surface of the slag bath in the furnace. In the reduction of the ore small iron drops very low in carbon are found which sink down through the slag and collect at the bottom of the furnace. When a sufficient quantity of iron is formed, the iron is in known manner tapped to a ladle to be cast in moulds. If desired, the iron is deoxidized before tapping in the moulds by adding ferro-manganese to the furnace or to the iron in the ladle, but as a rule no deoxidation is required. Before tapping a test is taken of the iron for ascertaining its temperature. If the temperature is not sufficiently high for obtaining the necessary temperature of the iron in the moulds, the iron is heated before tapping by running the furnace during an adequate length of time with the electrodes immersed in the slag.

For the production of so called rustless iron having a percentage of chromium of about 13% we may proceed as follows:

Briquettes are prepared in the manner set forth above of finely divided iron ore, finely divided chromium ore, finely divided carbonaceous material and a suitable binding agent. The proportions of the different constituents in the briquettes may be:

60 parts by weight of iron containing 63% Fe in the form of $Fe_3O_4$.

40 parts by weight of chromium ore having 51.6% $Cr_2O_3$ and 13.8% FeO.

16 parts by weight of charcoal containing 77% C, and 10 parts by weight of burnt lime.

By successively introducing and melting said briquettes in the electric furnace a metal bath is obtained containing about 10% Cr and about .07% C and a great quantity of slag rich in $Cr_2O_3$ and FeO. Then per 100 kg. of ore 3 to 5 kg. of ferro-silicon containing 50% Si is introduced directly onto the slag or a correspondingly smaller quantity of a ferro-silicon richer in Si. By the addition of ferro-silicon the greatest part of the content of $Cr_2O_3$ and FeO in the slag is reduced, the chromium and iron thus produced sinking down into the metal bath and joining with same. The metal bath thus obtained contains about 13 to 15% of chromium and about .07 to .12% carbon, the somewhat increased content of carbon depending on the carbon content in the ferro-silicon used. The content of Si in the metal is about .10 to .20%. Simultaneously with or after the addition of ferro-silicon a suitable quantity of lime may be added to the slag to bind the silica formed in the reaction of ferro-silicon with the metal oxides in the slag. On account of the decreased content in the slag of metal oxides, the electric conductivity of the slag will be decreased which is of advantage, as the temperature of the slag will thereby be increased and, consequently, also that of the metal bath so that a suitable tapping temperature of the metal will be obtained.

If it is desired to produce a greater quantity of rustless iron at one time, for instance 10 tons per smelting, it is preferred, when half the quantity of briquettes is melted, to add a corresponding quantity of ferro-silicon to the slag and then to tap a suitable part of the slag. Then the remaining quantity of the briquettes is reduced and melted, whereupon ferro-silicon is added to the new slag formed. The reason of proceeding in this manner is that on account of the great percentage of gangue in the chromium ore a great quantity of slag will be formed making such a tapping of slag suitable, it being difficult to run the furnace with so great quantity of slag as would be present in the furnace, if an intermediate tapping of slag is not made.

The invention is not limited to the metals or metal alloys or the admixtures etc. which have been mentioned hereinbefore by way of example only, but comprises any manufacture of metals very low in carbon and possessing carbon-binding properties, or any alloy of such metal, by the method herein set forth, in which a shortness of active carbon and if desired of other reducing agents, is used.

What we claim as new and desire to secure by Letters Patent of the United States of America is:—

1. In a reduction process for producing iron and other carbon binding metal and alloys thereof low in carbon directly from oxide ore in an electric furnace in a non-oxidizing atmosphere, the step of charging said furnace with briquettes of intimately mixed finely divided oxide ore and finely divided carbonaceous reducing material, the quantity of reducing agent being less than the theoretical amount required for reduction of the ore.

2. In a reduction process for producing iron and other carbon binding metal and alloys thereof low in carbon directly from oxide ore in an electric furnace in a non-oxidizing atmosphere, the step of charging said furnace with briquettes of intimately mixed finely divided oxide ore and finely divided reducing material including carbonaceous material, the quantity of reducing agent being less than the theoretical amount required for reduction of the ore.

3. In a reduction process for producing iron and other carbon binding metal and alloys thereof low in carbon directly from oxide ore in an electric furnace in a non-oxidizing atmosphere, the steps of charging onto a slag bath in the furnace briquettes of intimately mixed finely divided oxide ore and finely divided reducing material including carbonaceous material, the quantity of reducing agent being less than the theoretical amount required for reduction of the ore, and melting the briquettes at the surface of said slag bath.

4. In a reduction process for producing iron and other carbon binding metal and alloys thereof low in carbon directly from oxide ore in an electric furnace in a non-oxidizing atmosphere, the steps of charging practically continuously onto a slag bath in the furnace briquettes of intimately mixed finely divided oxide ore and finely divided carbonaceous reducing material, the quantity of reducing agent being less than the theoretical amount required for reduction of the ore, and successively melting the briquettes at the surface of said slag bath.

5. In a reduction process for producing low-carbon alloys of iron and other carbon binding metal directly from oxide ores in an electric furnace in a non-oxidizing atmosphere, the steps of charging said furnace with briquettes of intimately mixed finely divided oxide ore of the base metal of the alloy to be produced and finely divided carbonaceous material as reducing agent, and with briquettes of intimately mixed finely divided oxide ore of the alloy constituent and finely divided reducing material including carbonaceous material as reducing agent, the total quantity of reducing agent in both kinds of briquettes being less than the theoretical amount required for reduction of the ores.

6. In a reduction process for producing iron and other carbon binding metal and alloys thereof low in carbon directly from oxide ore in an electric furnace in a non-oxidizing atmosphere, the steps of charging said furnace with briquettes of intimately mixed finely divided oxide ore and finely divided carbonaceous reducing material, the quantity of reducing agent being less than the theoretical amount required for reduction of the ore, and melting the briquettes while making viscous the slag formed during said melting.

7. In a reduction process for producing iron and other carbon binding metals and alloys thereof low in carbon directly from oxide ore in an electric furnace in a non-oxidizing atmosphere, charging said furnace with briquettes of intimately mixed finely divided oxide ore and finely divided carbonaceous reducing material, the quantity of reducing agent being less than the theoretical amount required for reduction of the ore, melting the briquettes and adding during said melting a substance to increase the viscosity of the formed slag.

8. In a reduction process for producing iron having a percentage of carbon not exceeding .05% directly from iron oxide ore in an electric furnace in a non-oxidizing atmosphere, the step of charging said furnace with briquettes of intimately mixed finely divided iron oxide ore and finely divided carbonaceous reducing material, the quantity of reducing agent being less than the theoretical amount required for reduction of the ore.

9. An endothermic reduction process for producing iron and other carbon binding metals and alloys thereof low in carbon directly from oxide ore, consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, and decreasing during melting the electric conductivity of the slag formed.

10. An endothermic reduction process for producing iron and other carbon binding metals and alloys thereof low in carbon directly from oxide ore, consisting in reducing and melting in an electric furnace in a non-oxidizing atmosphere a charge composed of finely divided oxide ore and finely divided carbonaceous reducing material, mixed and solidfied, the quantity of reducing agent being less than the theoretical amount required for reduction of the ore, decreasing during melting the electric conductivity of the slag formed, and running the furnace, immediately prior to tapping, for an adequate length of time with the electrode immersed in the slag.

11. An endothermic reduction process for producing iron and other carbon binding metals and alloys thereof low in carbon directly from oxide ore consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, and decreasing the electric conductivity of the slag formed and liberating metal of the metal oxides in the slag by adding a thermic reducing agent to the slag bath.

12. An endothermic reduction process for producing iron and other carbon binding metals and alloys thereof low in carbon directly from oxide ore, consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, and decreasing the electric conductivity of the slag formed and liberating metal of the metal oxides in the slag by adding ferro-silicon to the slag bath.

13. An endothermic reduction process for producing iron and other carbon binding metals and alloys thereof low in carbon directly from oxide ore, consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, and decreasing the electric conductivity of the slag formed and liberating metal of the metal oxides in the slag by adding to the slag bath a thermic reducing agent and a substance capable of binding the by-products formed in the reaction of the thermic reducing agent with the metal oxides in the slag.

14. An endothermic reduction process for producing iron and other carbon binding metals and alloys thereof low in carbon directly from oxide ore, consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, decreasing the electric conductivity of the slag formed and liberating metal of the metal oxides in the slag by adding to the slag bath a thermic reducing agent and a substance capable of binding the by-products formed in the reaction of the thermic reducing agent with the metal oxides in the slag, and running the furnace, immediately prior to tapping, for an adequate length of time with the electrode immersed in the slag.

15. An endothermic reduction process for producing iron and other carbon binding metals and alloys thereof low in carbon directly from oxide ore consisting in reducing and melting in an electric furnace in a non-oxidizing atmosphere a charge composed of finely divided oxide ore and finely divided carbonaceous reducing material, mixed and solidified, the quantity of reducing agent being less than the theoretical amount required for reduction of the ore, and decreasing the electric conductivity of the slag formed and liberating metal of the metal oxides in the slag by adding to the slag briquettes composed of a thermic reducing agent and a substance capable of binding the by-products formed in the reaction of the thermic reducing agent with the metal oxides in the slag.

16. In a reduction process for producing rustless iron and steel directly from oxide ores in an electric furnace in a non-oxidizing atmosphere, the steps of charging onto a slag bath in the furnace briquettes of intimately mixed finely divided chromium oxide ore and iron oxide ore and finely divided carbonaceous reducing material, the quantity of reducing agent being less than the theoretical amount required for reduction of the ores, melting the briquettes at the surface of the slag bath, and decreasing the electric conductivity of the slag formed and liberating metal of the metal oxides in the slag by adding ferro-silicon to the slag bath.

In testimony whereof we affix our signatures.

HENNING GUSTAV FLODIN.
EMIL GUSTAF TORVALD GUSTAFSSON.